(12) United States Patent
Veros

(10) Patent No.: US 8,375,990 B2
(45) Date of Patent: Feb. 19, 2013

(54) MIXING VALVE INCLUDING DUAL FLOW CONTROL

(75) Inventor: Michael J. Veros, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 423 days.

(21) Appl. No.: 12/711,824

(22) Filed: Feb. 24, 2010

(65) Prior Publication Data
US 2011/0203690 A1 Aug. 25, 2011

(51) Int. Cl.
F16K 11/078 (2006.01)
(52) U.S. Cl. .................................. 137/625.4
(58) Field of Classification Search ........... 137/625.17, 137/625.4, 625.41
See application file for complete search history.

(56) References Cited

U.S. PATENT DOCUMENTS

| | | | |
|---|---|---|---|
| 4,327,758 A * | 5/1982 | Uhlmann | 137/625.17 |
| 4,576,202 A | 3/1986 | Knapp | |
| 4,672,999 A | 6/1987 | Knapp | |
| 4,700,885 A | 10/1987 | Knebel | |
| 4,733,693 A | 3/1988 | Knapp | |
| 4,869,427 A | 9/1989 | Kawamoto et al. | |
| 5,170,361 A | 12/1992 | Reed | |
| 5,664,603 A | 9/1997 | Knapp | |
| 5,931,374 A * | 8/1999 | Knapp | 236/12.2 |
| 6,029,699 A | 2/2000 | Granot | |
| 6,135,152 A * | 10/2000 | Knapp | 137/625.41 |
| 6,321,786 B2 | 11/2001 | Schumacher | |
| 6,364,210 B1 | 4/2002 | Lorch | |
| 6,517,006 B1 * | 2/2003 | Knapp | 236/12.2 |
| 6,640,357 B1 | 11/2003 | Chang | |
| 6,805,151 B1 | 10/2004 | Chang | |
| 6,845,917 B1 * | 1/2005 | Chen | 236/12.1 |
| 6,920,899 B2 | 7/2005 | Haenlein et al. | |
| 7,014,166 B1 | 3/2006 | Wang | |
| 7,040,348 B2 * | 5/2006 | Bolgar et al. | 137/625.41 |
| 7,108,012 B2 | 9/2006 | Rosko et al. | |
| 7,111,643 B2 * | 9/2006 | Oh | 137/625.41 |
| 7,134,452 B2 * | 11/2006 | Hiroshi et al. | 137/625.41 |
| 7,137,410 B2 | 11/2006 | Rosko | |
| 7,174,916 B2 | 2/2007 | Chang | |
| 7,325,747 B2 | 2/2008 | Jonte | |
| 7,337,804 B2 | 3/2008 | Rosko | |
| 7,389,793 B2 | 6/2008 | Wang | |
| 7,628,173 B2 | 12/2009 | Rosko et al. | |
| 8,176,937 B2 * | 5/2012 | Zhang et al. | 137/597 |
| 2007/0044850 A1 | 3/2007 | Pieters | |
| 2007/0246550 A1 | 10/2007 | Rodenbeck et al. | |
| 2007/0277889 A1 | 12/2007 | Rosko | |
| 2008/0023085 A1 | 1/2008 | Rosko et al. | |
| 2008/0072965 A1 | 3/2008 | Buechel | |
| 2009/0039176 A1 | 2/2009 | Davidson et al. | |

* cited by examiner

Primary Examiner — John Fox
(74) Attorney, Agent, or Firm — Faegre Baker Daniels LLP

(57) ABSTRACT

A mixing valve for use with a faucet. The mixing valve includes a rotatable flow control member having a flow control channel with circumferentially space flow control portions for controlling temperature and flow rate of outlet water.

35 Claims, 11 Drawing Sheets

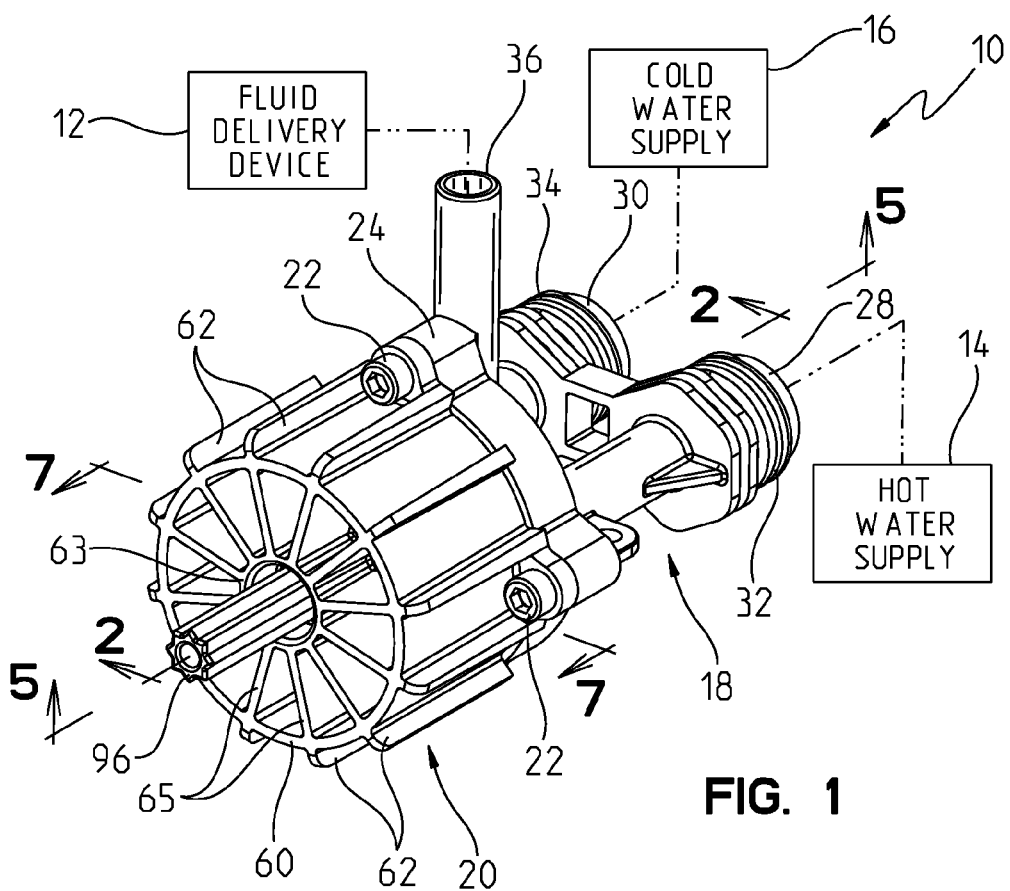
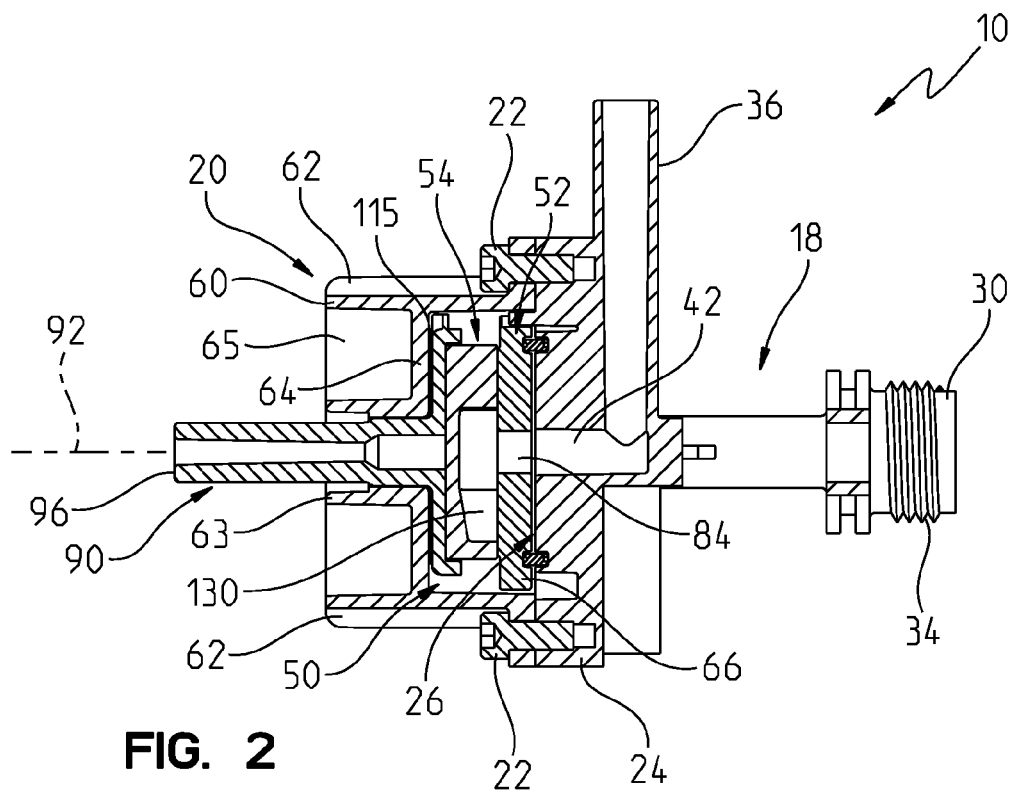

MIXING VALVE INCLUDING DUAL FLOW CONTROL

BACKGROUND AND SUMMARY OF THE INVENTION

The present invention relates generally to fluid control valves and, more particularly, to a mixing valve for use with a faucet.

Mixing valves are a known type of fluid control valve including components for controlling the temperature of water supplied to a fluid delivery device. One such mixing valve is a cycling valve including a flow control member supported for rotation about a center axis. Rotation of the flow control member adjusts the mixing ratio of water from respective hot and cold water inlet ports to a water outlet port, thereby adjusting the temperature of water at the outlet port.

Known cycling valves typically control the mixing ratio of water from the hot and cold water inlet ports and, as such, outlet water temperature but not outlet water flow rate. Control of outlet water flow rate may also be provided through the addition of a second cycling valve or an adjustable flow restriction device.

According to an illustrative embodiment of the present disclosure, a mixing valve includes a first flow control member having a first surface, a hot water inlet port, and a cold water inlet port. A second flow control member includes a second surface facing the first surface of the first flow control member. The second flow control member is supported for rotation about a center axis extending perpendicular to the second surface such that the second surface is in sliding contact with the first surface. A flow control channel extends inwardly from the second surface of the second flow control member. The flow control channel includes a first hot water flow control portion, a first cold water flow control portion circumferentially spaced from the first hot water flow control portion, a second hot water flow control portion circumferentially spaced intermediate the first cold water flow control portion and the first hot water flow control portion in a first angular direction from the first cold water flow control portion, and a second cold water flow control portion circumferentially spaced intermediate the first cold water flow control portion and the first hot water flow control portion in a second angular direction from the first cold water flow control portion. The first angular direction is one of clockwise and counterclockwise, and the second angular direction is the other of counterclockwise and clockwise. A carrier is operably coupled to the second flow control member for rotating the flow control portions of the flow control channel in an arcuate path about the center axis. Rotation of the second flow control member about the center axis within a first angular range aligns at least one of the first hot water flow control portion with the hot water inlet port, and the first cold water flow control portion with the cold water inlet port for permitting fluid flow at a first flow rate through the flow control channel. Rotation of the second flow control member about the center axis within a second angular range aligns at least one of the second hot water flow control portion with the hot water inlet port, and the second cold water flow control portion with the cold water inlet port for permitting fluid flow at a second flow rate through the flow control channel.

According to a further illustrative embodiment of the present disclosure, a mixing valve includes a first flow control member having a first surface and a first inlet port. A second flow control member includes a second surface slidably engaging the first surface of the first flow control member. A flow control channel extends inwardly from the second surface of the second flow control member. The flow control channel includes a central chamber, a first water flow control portion extending radially outwardly from the central chamber and including an outer control edge, a second water flow control portion extending radially outwardly from the central chamber and circumferentially spaced from the first water flow control portion. The second water flow control portion includes an outer control edge positioned radially outwardly from the outer control edge of the first water flow control portion. A carrier is operably coupled to the second flow control member for moving the water flow control portions of the flow control channel. Full overlap of the first water flow control portion and the first inlet port defines a fluid passageway having a first cross-sectional flow area, and full overlap of the second water flow control portion and the first inlet port defines a fluid passageway having a second cross-sectional flow area. The first cross-sectional flow area is less than the second cross-sectional flow area.

According to another illustrative embodiment of the present disclosure, a mixing valve includes a first flow control member having a first surface, a hot water inlet port, and a cold water inlet port. A second flow control member includes a second surface facing the first surface of the first flow control member. The second flow control member is supported for rotation about a center axis extending perpendicular to the second surface such that the second surface is in sliding contact with the first surface. A flow control channel extends inwardly from the second surface of the second flow control member. The second flow control member is rotatable about the center axis between an off position, a first flow position, and a second flow position. The off position is defined when the second surface of the second flow control member blocks water flow from passing through the hot water inlet port and the cold water inlet port. The first flow position is defined by rotating the second flow control member about the center axis within a first angular range wherein the flow control channel permits water flow to pass through at least one of the hot water inlet port and the cold water inlet port at a substantially constant first flow rate. The second flow position is defined by rotating the second flow control member about the center axis within a second angular range wherein the flow channel permits water flow to pass through at least one of the hot water inlet port and the cold water inlet port at a substantially constant second flow rate.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1 is a perspective view of an illustrative mixing valve of the present disclosure;

FIG. 2 is a cross-sectional view taken along line 2-2 of FIG. 1;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Referring initially to FIG. 1, a mixing valve 10 according to an illustrative embodiment of the present disclosure is shown. The mixing valve 10 may be used in connection with a fluid delivery device 12, such as a faucet assembly including a delivery spout and/or hand sprayer (not shown). More particularly, the illustrative mixing valve 10 is configured to receive hot water from a hot water supply 14 and cold water from a cold water supply 16, and to supply outlet water selectively at variable temperature and flow rates to the fluid delivery device 12.

Figure 3:
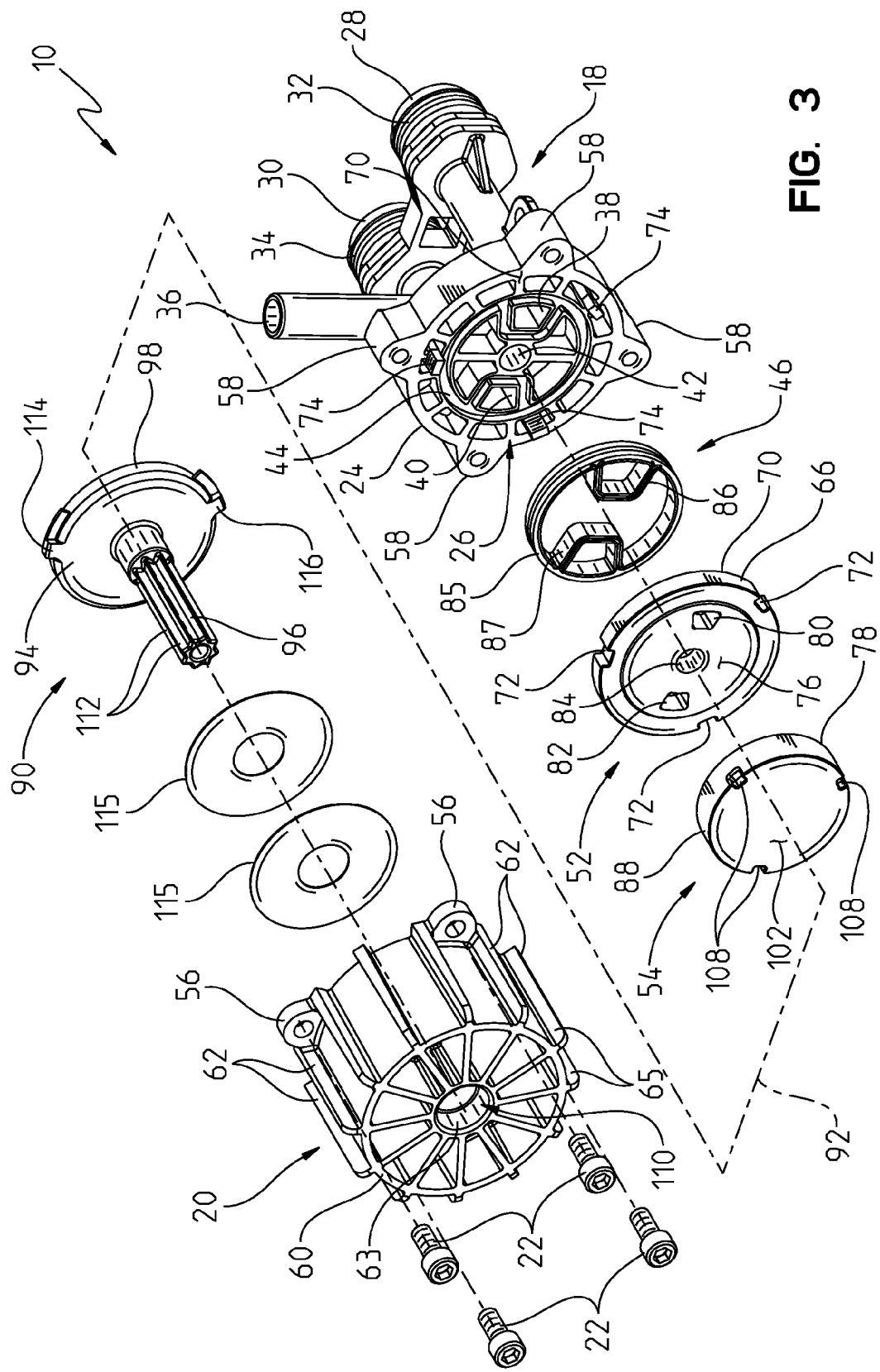
FIG. 3 is a front exploded perspective view of the mixing valve of FIG. 1.
Figure 4:
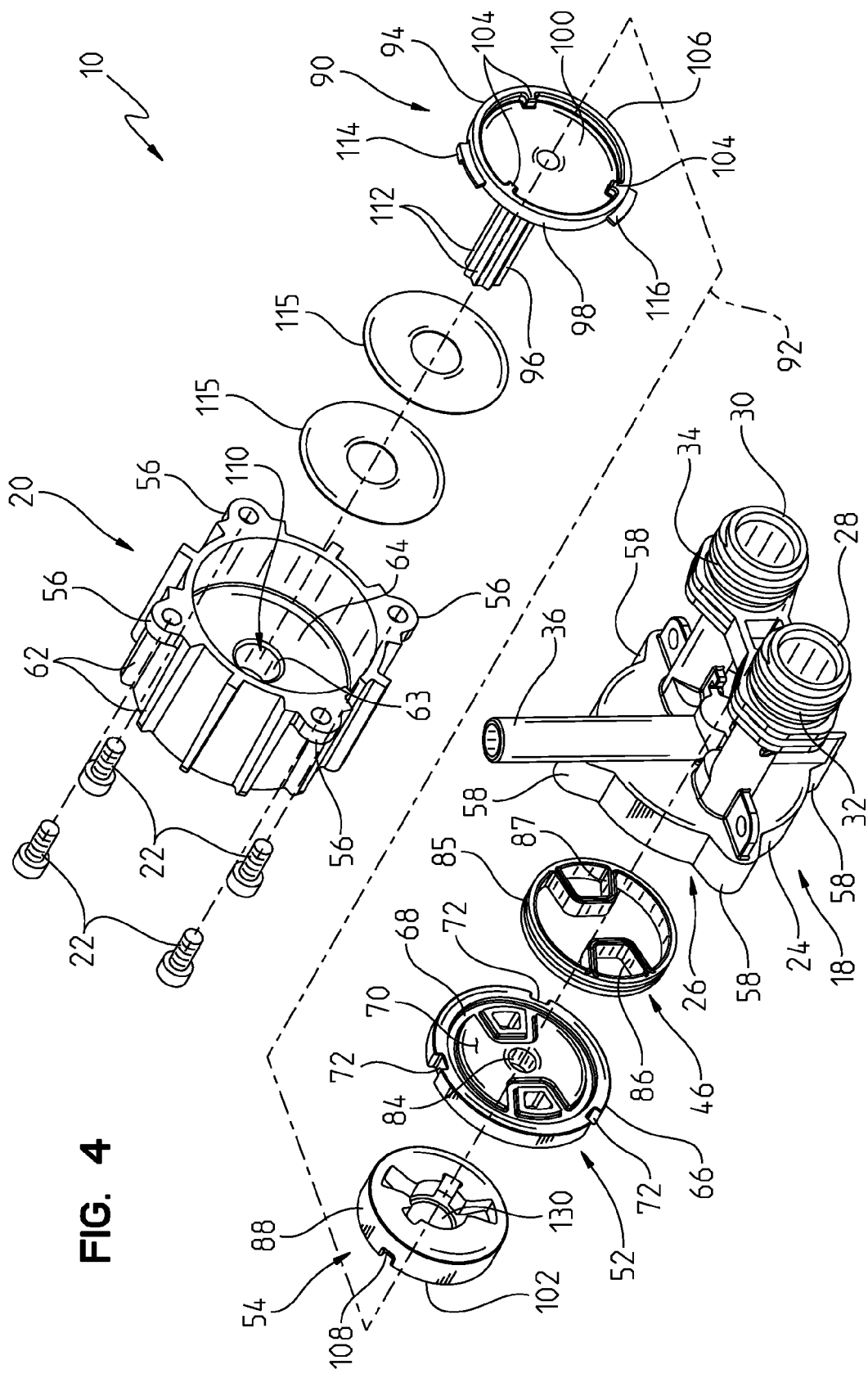
FIG. 4 is a rear exploded perspective view of the mixing valve of FIG. 1.

Referring now to FIGS. 1-4, the mixing valve 10 illustratively includes a valve body 18 coupled to a valve housing 20 through a plurality of fasteners, such as socket head cap screws 22. The valve body 18 includes a base 24 defining an interface 26 (FIG. 3). A hot water inlet conduit 28 and a cold water inlet conduit 30 extend longitudinally from the base 24. The hot water inlet conduit 28 and the cold water inlet conduit 30 include couplers, illustratively external threads 32 and 34, for fluidly coupling with supply tubes to provide fluid communication with the hot water supply 14 and the cold water supply 16, respectively. A mixed water outlet conduit 36 extends laterally from the base 24 and is configured to be fluidly coupled to the fluid delivery device 12. A conventional fluid coupling (not shown) may be supported by the outlet conduit 36 for connecting to an outlet tube (not shown).

Figure 5:
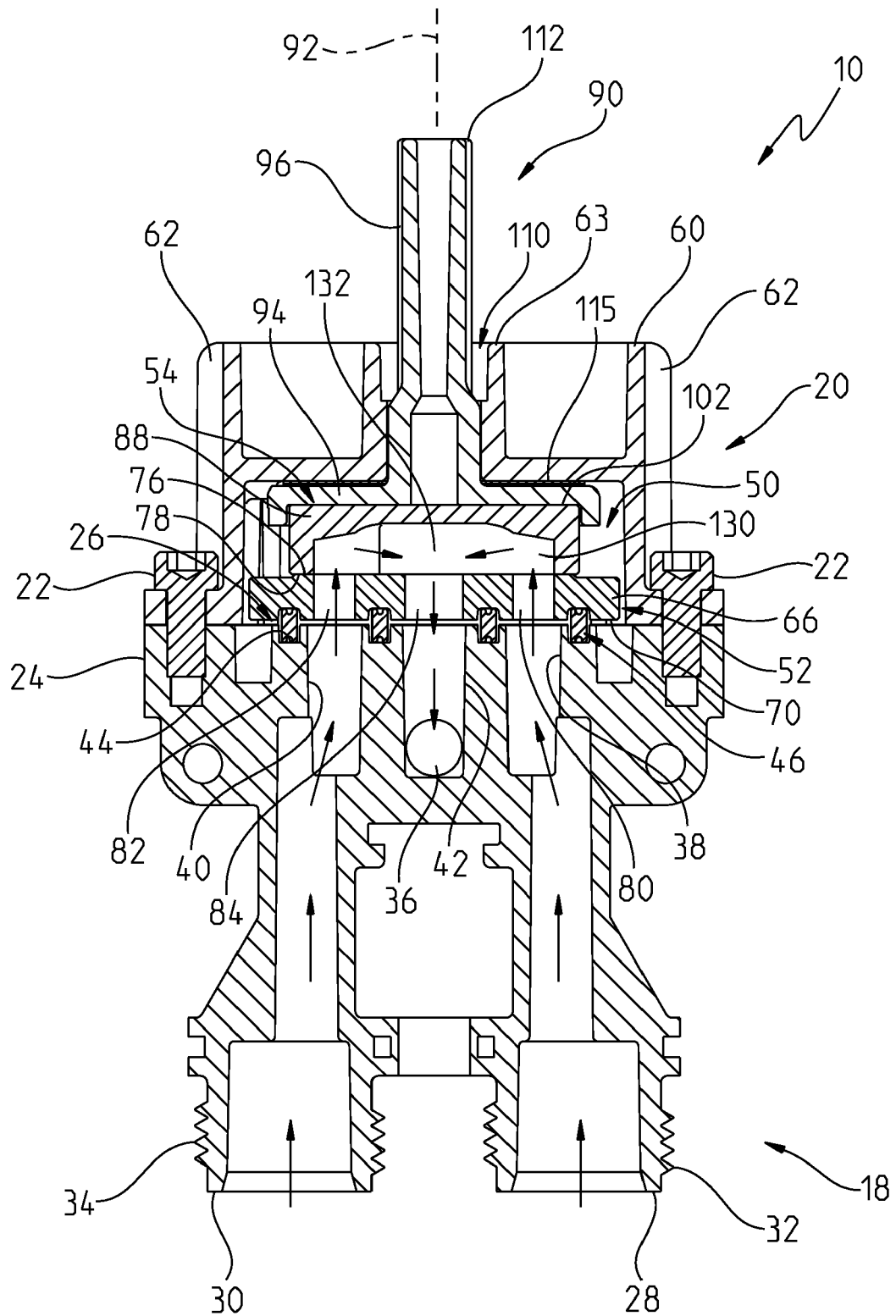
FIG. 5 is a cross-sectional view taken along line 5-5 of FIG. 1.

With reference to FIGS. 3 and 5, the interface 26 of the base 24 includes a hot water inlet port 38 in fluid communication with the hot water inlet conduit 28, and a cold water inlet port 40 in fluid communication with the cold water inlet conduit 30. A mixed water outlet port 42 is positioned intermediate the hot water inlet port 38 and the cold water inlet port 40, and is in fluid communication with the outlet conduit 36. A seat, illustratively a groove 44, may be formed within the interface 26 and is configured to receive a seal or gasket 46. Illustratively, the valve body 18 is molded from a polymer. In one illustrative embodiment, the valve body 18 is molded from a thermoplastic polyamide, such as Zytel®, available from DuPont Engineering Polymers of Wilmington, Del.

Referring now to FIGS. 2 and 5, the valve housing 20 cooperates with the valve body 18 to define a chamber 50 receiving a first flow control member 52 and a second flow control member 54. Screws 22 extend through bosses 56 formed in the valve housing 20 and are threadably received within extensions 58 of the base 24 of the valve body 18. The valve housing 20 includes a cylindrical outer wall 60 including a plurality of radially outwardly extending strengthening ribs 62. A central hub 63 is coupled to the outer wall 60 by a connecting member 64. A plurality of radially inwardly extending strengthening ribs 65 further couple the outer wall 60 with the central hub 63. The cylindrical outer wall 60 defines the chamber 50 for receiving the first and second flow control members 52 and 54. As with the valve body 18, the valve housing 20 may be molded from a thermoplastic polyamide, such as Zytel®.

With reference to FIGS. 2-9, the internal components of the mixing valve 10 are further illustrated. The first flow control member 52, illustratively a substantially planar lower plate 66, is supported by the interface 26 of the valve body 18. The seal 46 is positioned intermediate the lower plate 66 and the seat 44 of the interface 26. Illustratively, the seal 46 extends into a seat, illustratively a groove 68, formed within the lower surface 70 of the lower plate 66. A plurality of notches 72 are formed within the outer periphery of the lower plate 66 and are configured to cooperate with tabs 74 formed in the base 24 of the valve body 18 to prevent relative rotation therebetween.

The lower plate 66 includes a substantially planar upper or first surface 76 configured to sealingly engage a substantially planar lower or second surface 78 of the second flow control member 54. A first or hot water inlet port 80 extends between lower and upper surfaces 70 and 76 and is in fluid communication with the hot water inlet conduit 28 of the valve body 18. Similarly, a second or cold water inlet port 82 extends between lower and upper surfaces 70 and 76 and is in fluid communication with the cold water inlet conduit 30 of the valve body 18. A mixed water outlet port 84 illustratively extends between lower and upper surfaces 70 and 76 and is in fluid communication with the outlet conduit 36. The outlet port 84 is illustratively positioned intermediate, and in alignment with, the inlet ports 80 and 82.

The seal 46 extends around the hot water inlet port 80 and the cold water inlet port 82 to provide a fluid passageway between the lower plate 66 and the respective ports 38 and 40 of the interface 26. More particularly, the seal 46 includes an outer ring 85 coupled to inner loops 86 and 87. The inner loop 86 cooperates with the outer ring 85 to seal around the hot water inlet ports 38 and 80, while the inner loop 87 cooperates with the outer ring 85 to seal around the cold water inlet ports 40 and 82. The seal 46 is illustratively formed of a resilient material, such as silicone.

The second flow control member 54 illustratively includes a substantially planar upper plate 88 including lower (second) surface 78 facing the upper (first) 76 surface of the lower plate 66. A carrier 90 is operably coupled to the upper plate 88 and is configured to rotate the upper plate 88 about a center axis 92 extending perpendicular to the second surface 78. As noted above, first surface 76 of the first flow control member 52 is in sliding and sealing contact with the second surface 78 of the second flow control member 54. Both the lower plate 66 of the first flow control member 52 and the upper plate 88 of the second flow control member 54 are illustratively formed of alumina ceramic.

With reference to FIGS. 3, 4, 6, and 8, the carrier 90 illustratively includes a base 94 operably coupled to a stem 96. The base 94 may comprise a disc 98 including a lower recess 100 for receiving the upper surface 102 of the upper plate 88. A plurality of tabs 104 extend radially inwardly from an annular ridge 106 and are received within notches 108 formed in the upper surface 102 of the upper plate 88 for rotationally securing the carrier 90 to the second flow control member 54. The stem 96 extends longitudinally along the center axis 92 and through an opening 110 formed in the central hub 63 of the valve housing 20. The stem 96 illustratively includes a plurality of splines 112 to facilitate coupling with a drive member 111 (FIG. 10), such as an electric motor or handle. A pair of bearing rings 115 are illustratively received over the stem 96, and are positioned intermediate the disc 98 and the connecting member 64 of the valve housing 20. The bearing rings 115 are illustratively formed of a polyethylene, and are configured to reduce wear between the carrier 90 and the valve housing 20.

Figure 6:
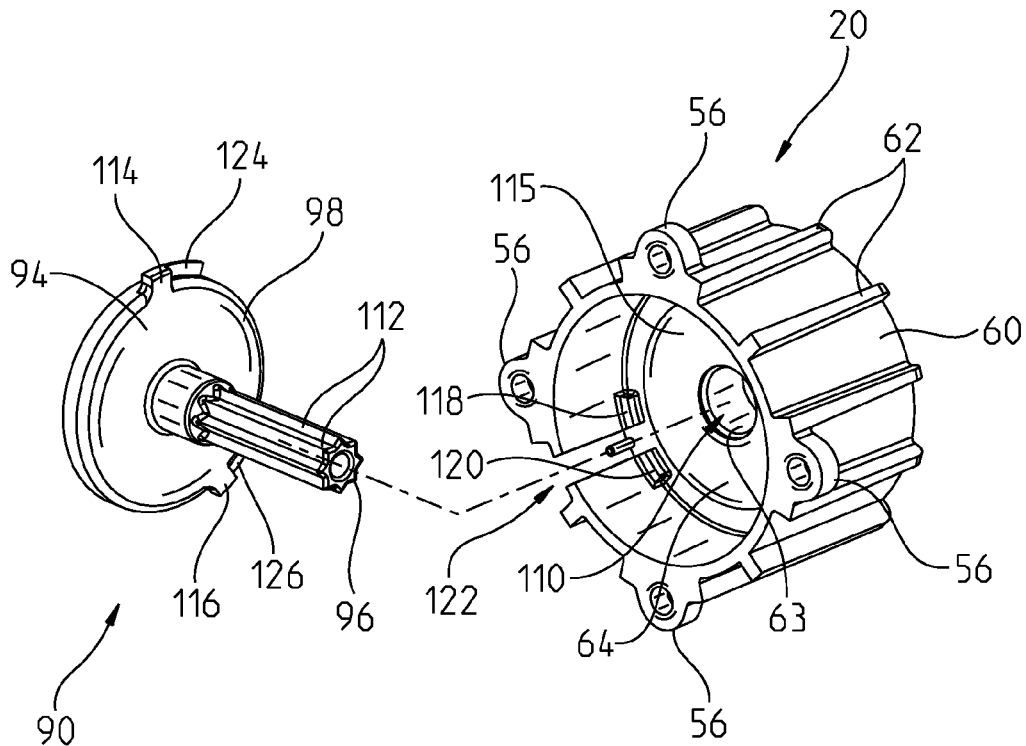
FIG. 6 is a partially exploded perspective view showing the valve housing and the carrier of the mixing valve of FIG. 1.
Figure 7:
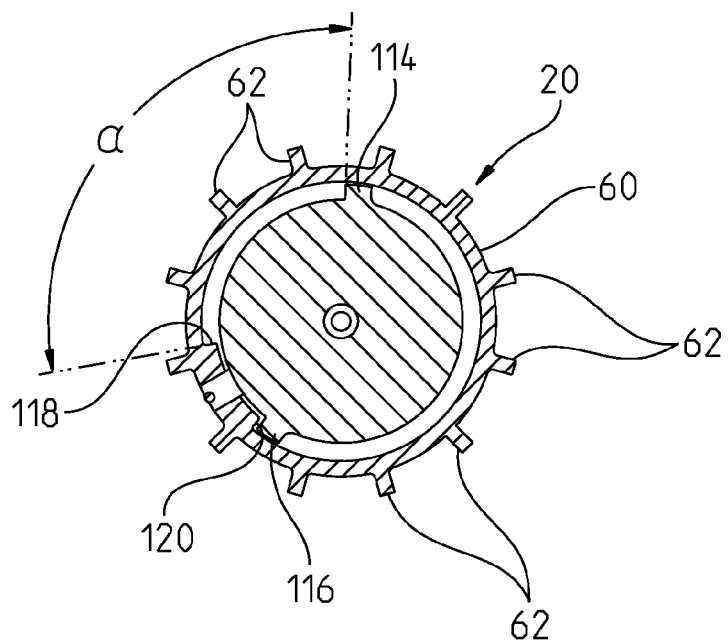
FIG. 7 is a cross-sectional view taken along line 7-7 of FIG. 1.
Figure 8:
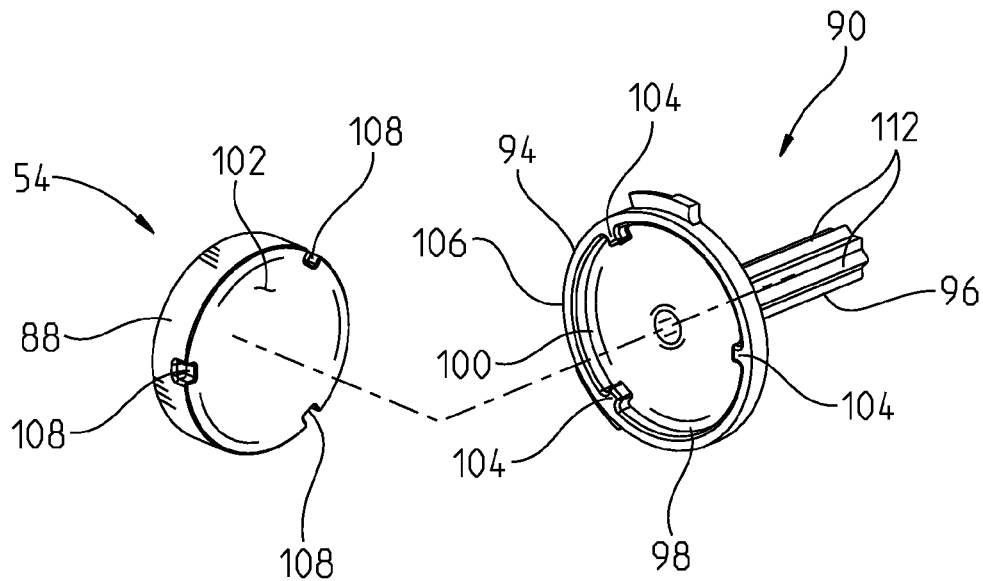
FIG. 8 is partially exploded perspective view showing the carrier and the second flow control member of the mixing valve of FIG. 1.

With reference to FIGS. 6 and 7, a pair of stop members 114 and 116 extend radially outwardly from the base 94 of the carrier 90 and are configured to cooperate with a pair of tabs 118 and 120 extending radially inwardly from the wall 60 of the valve housing 20. More particularly, the stop member 114 is configured to engage tab 118 to provide a limit stop for counterclockwise rotation. Similarly, the stop member 116 is configured to engage tab 120 to provide a limit stop for clockwise rotation. The stop members 114 and 116 cooperate with the tabs 118 and 120, respectively, to provide a maximum rotation of the second flow control member 54 of $\alpha$ (FIG. 7). In one illustrative embodiment, $\alpha$ is approximately 102 degrees. The carrier 90 may be formed from a polymer. In one illustrative embodiment, the carrier 90 is molded of a polyphthalamide, such as Grivory®, available from EMS-CHEMIE of Sumter, S.C.

Figure 10:
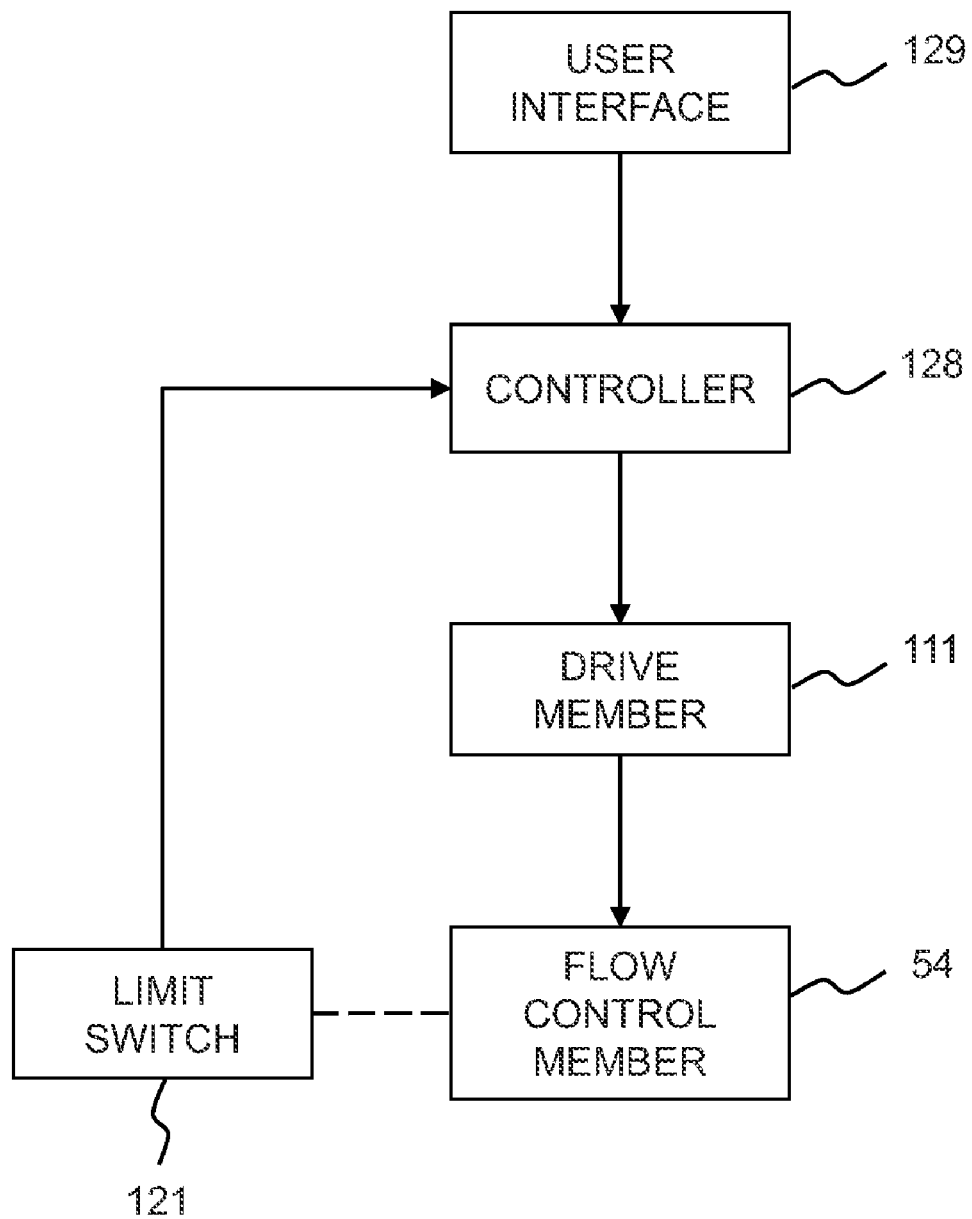
FIG. 10 is a schematic view of an illustrative drive system for the mixing valve of FIG. 1.

With reference to FIGS. 6 and 10, an electronic limit switch 121 may be supported within a slot 122 formed within wall 60 of the valve housing 20 for controlling drive member 111, such as an electric motor, operably coupled to the second flow control member 54 through the stem 96. More particularly, the electronic limit switch 121 may be triggered by extensions 124 and 126 of the stop members 114 and 116, respectively, whereupon a controller 128 deactivates the drive member 111. A user interface 129, such as push buttons on a control panel, may be operably coupled to the controller 128 to set a user desired outlet water temperature and/or flow rate.

Figure 9:
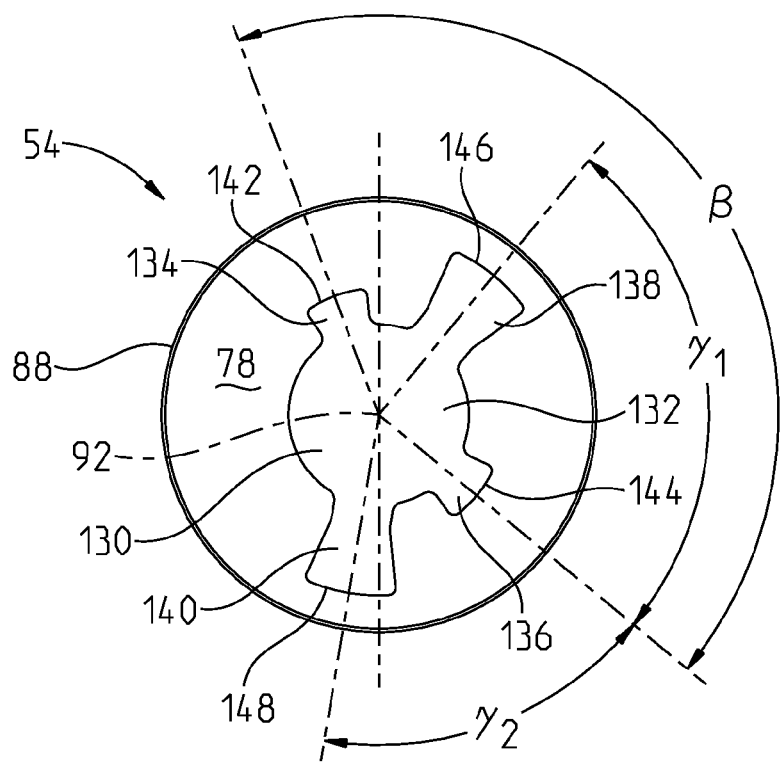
FIG. 9 is a bottom plan view of the second flow control member of FIG. 8.

With reference to FIG. 9, a flow control channel 130 extends inwardly from the second surface 78 of the upper plate 88. The flow control channel 130 is illustratively closed in that it does not extend through to the upper surface 102 of the upper plate 88 and has a periphery sealed by cooperating surfaces 76 and 78 of the plates 66 and 88, respectively (FIG. 5). While a closed valve is illustrated, it should be appreciated that the present invention may find equal applicability with open valve designs. The flow control channel 130 includes a central chamber 132 extending around the center axis 92, and radially outwardly extending flow control portions 134, 136, 138, and 140 fluidly coupled to the central chamber 132.

More particularly, the flow control channel 130 includes a first hot water flow control portion 134 and a first cold water flow control portion 136 circumferentially spaced from the first hot water flow control portion 134. A second hot water flow control portion 138 is circumferentially spaced intermediate the first cold water flow control portion 136 and the first hot water flow control portion 134 in a first angular direction (illustratively counterclockwise in FIG. 9) from the first cold water flow control portion 136. A second cold water flow control portion 140 is circumferentially spaced intermediate the first cold water flow control portion 136 and the first hot water flow control portion 134 in a second angular direction (illustratively clockwise in FIG. 9) from the first cold water flow control portion 136. In the illustrative embodiment, the first hot water flow control portion 134 is rotationally oriented relative to the first cold water flow control portion 136 by the angle $\beta$ (approximately 150 degrees in FIG. 9). Further illustratively, the second hot water flow control portion 138 is rotationally oriented relative to the first cold water flow control portion 136 by angle $\gamma 1$ (approximately 90 degrees in FIG. 9), and is rotationally oriented relative to the second cold water flow control portion 140 by angle $\gamma 2$ (approximately 60 degrees in FIG. 9).

The first hot water flow control portion 134 and the first cold water flow control portion 136 include outer control edges 142 and 144, respectively. Similarly, the second hot water flow control portion 138 and the second cold water flow control portion 140 include outer control edges 146 and 148, respectively. The outer control edges 146 and 148 of the second hot water flow control portion 138 and the second water flow control portion 140 are disposed radially outwardly from the outer control edges 142 and 144 of the first hot water flow control portion 134 and the first cold water flow control portion 136. The central chamber 132 fluidly couples together the first hot water flow control portion 134, the first cold water flow control portion 136, the second hot water flow control portion 138, and the second cold water flow control portion 140.

Figure 13:
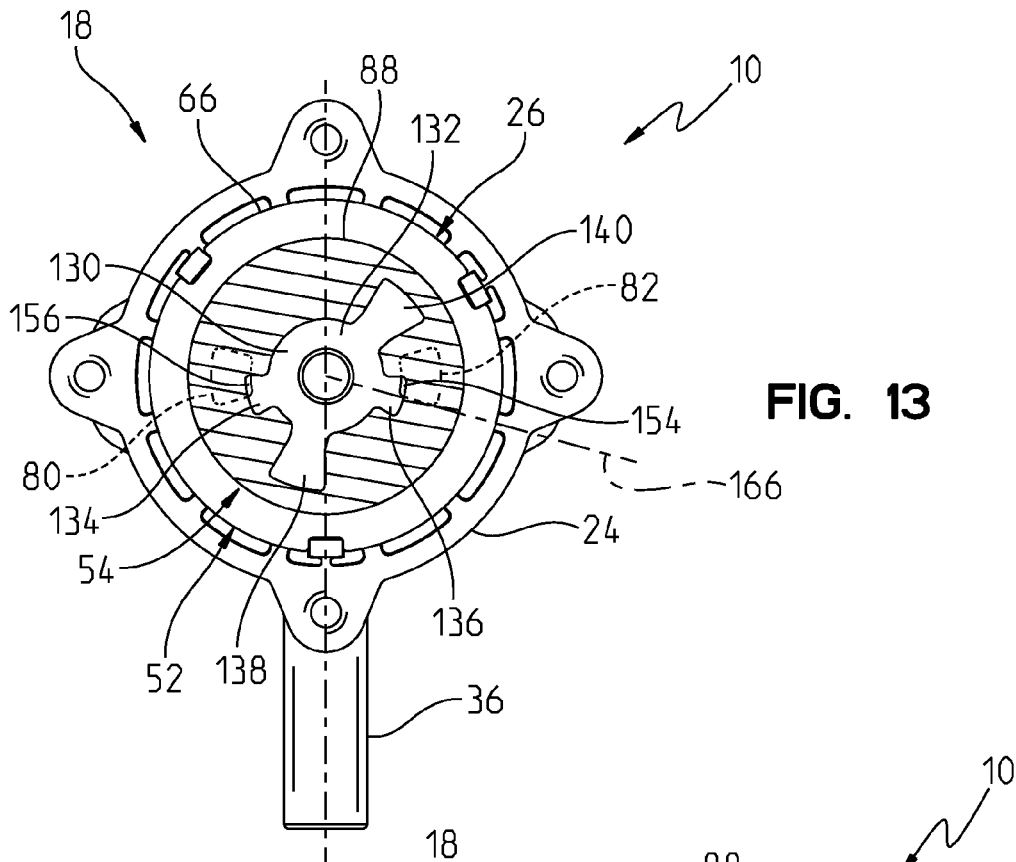
FIG. 13 is a view similar to FIG. 11, showing the mixing valve in a low flow, full mixed mode.
Figure 14:
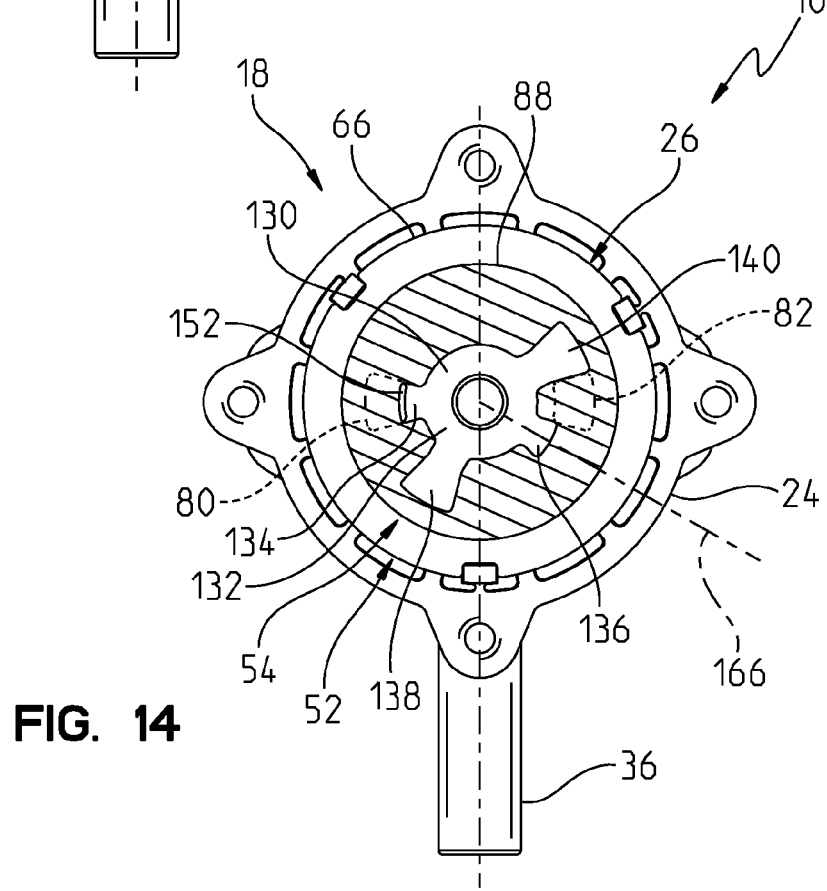
FIG. 14 is a view similar to FIG. 11, showing the mixing valve in a low flow, full hot mode.

The first hot water flow control portion 134 illustratively has a cross-sectional area substantially equal to the first cold water flow control portion 136, while the second hot water flow control portion 138 illustratively has a cross-sectional area substantially equal to the second cold water flow control portion 140. Further, the cross-sectional areas of the first flow control portions 134 and 136 are illustratively smaller than the cross-sectional areas of the second flow control portions 138 and 140. Full overlap of the first cold water flow control portion 136 and the cold water inlet port 82 defines a fluid passageway 150 (FIG. 12), and full overlap of the first hot water flow control portion 138 and the hot water inlet port 80 defines a fluid passageway 152 (FIG. 14). The fluid passageways 150 and 152 each include a substantially equal cross-sectional flow area. Additionally, partial overlap of the first cold water flow control portion 136 and the first hot water flow control portion 138 with the cold water inlet port 82 and hot water inlet port 80 defines fluid passageways 154 and 156, respectively (FIG. 13). The combined cross-sectional flow area of fluid passageways 154 and 156 is equal to that of each fluid passageway 150 and 152. As such, substantially constant flow rate is maintained as the second flow control member 54 is rotated clockwise over an angular range (illustratively about 30 degrees) from the low flow, full cold mode position of FIG. 12 to the low flow, full hot mode position of FIG. 14.

Figures 15, 16:
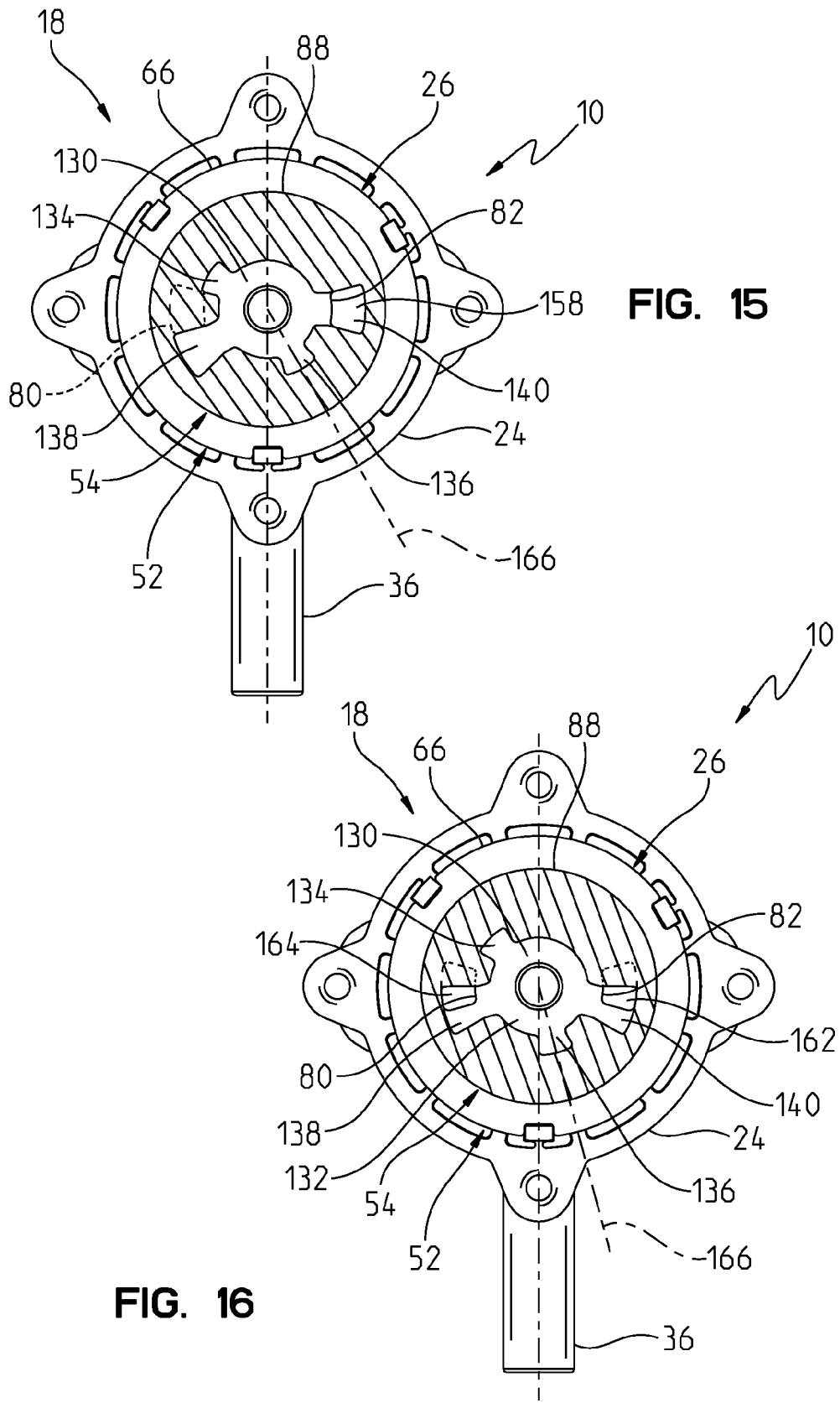
FIG. 15 is a view similar to FIG. 11, showing the mixing valve in a high flow, full cold mode.
FIG. 16 is a view similar to FIG. 11, showing the mixing valve in a high flow, full mixed mode.
Figure 17:
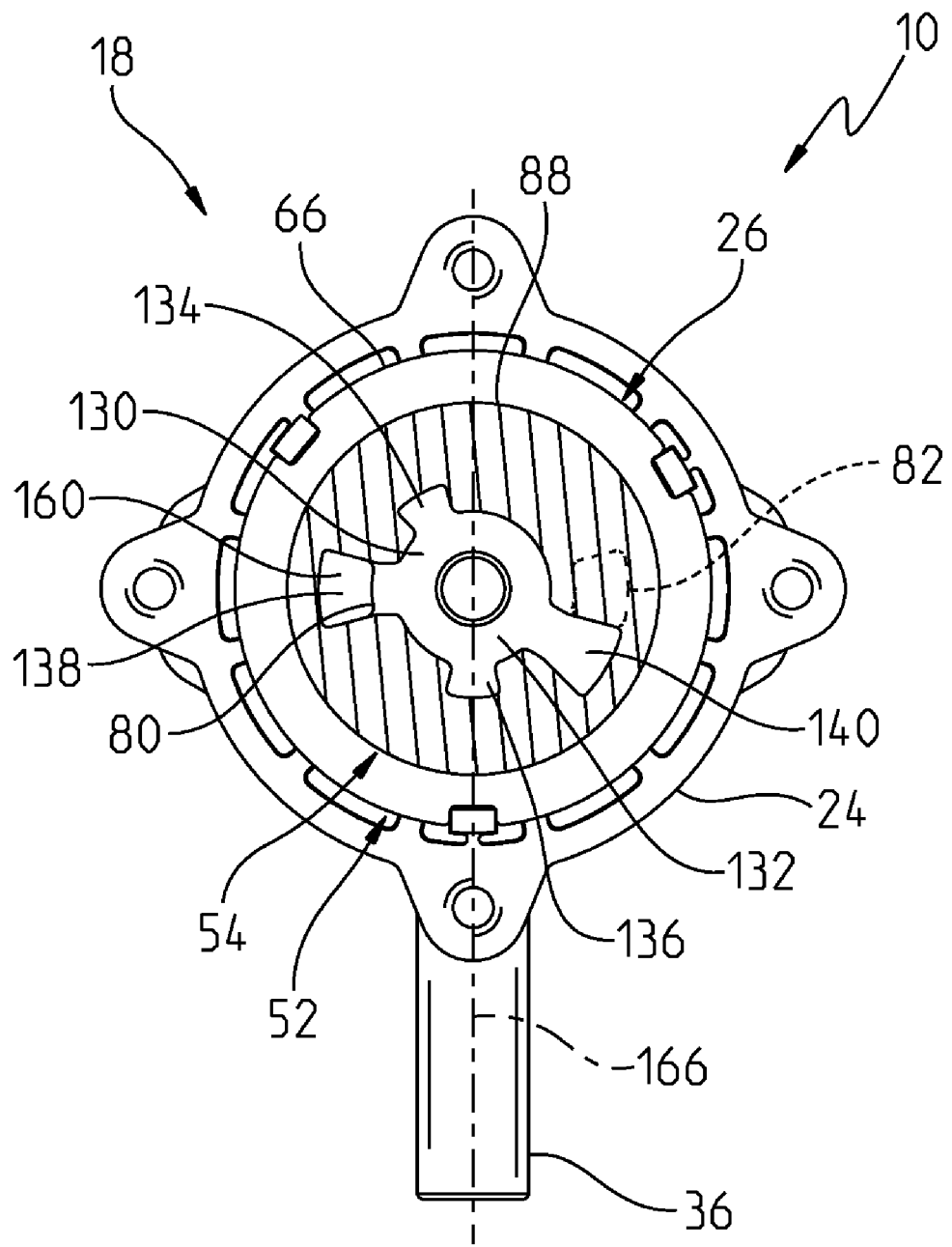
FIG. 17 is a view similar to FIG. 11, showing the mixing valve in a high flow, full hot mode.

Full overlap of the second cold water flow control portion 140 and the cold water inlet port 82 defines a fluid passageway 158 (FIG. 15), and full overlap of the second hot water flow control portion 138 and the hot water inlet port 80 defines a fluid passageway 160 (FIG. 17). The fluid passageways 158 and 160 each include a substantially equal second cross-sectional flow area. Additionally, partial overlap of the second cold water flow control portion 140 and the second hot water flow control portion 142 with the cold water inlet port 82 and the hot water inlet port 80 defines fluid passageways 162 and 164, respectively (FIG. 16). The combined cross-sectional flow area of fluid passageways 162 and 164 is equal to that of each fluid passageway 158 and 160. As such, substantially constant flow rate is maintained as the second flow control member 54 is rotated clockwise over an angular range (illustratively about 30 degrees) from the high flow, full cold mode position of FIG. 15 to the high flow, full hot mode position of FIG. 17.

In the illustrative embodiment, the first cross-sectional areas of the fluid passageways 150 and 152 (and combination of fluid passageways 154 and 156) are each less than the second cross-sectional areas of the fluid passageways 158 and 160 (and combination of fluid passageways 162 and 164). As such, the fluid passageways 150 and 152 (and combination of fluid passageways 154 and 156) provide for a low flow rate less than a high flow rate of the fluid passageways 158 and 160 (and combined fluid passageways 162 and 164).

While the illustrative embodiment shows first and second water flow control portions 134, 136 and 138, 140, it should be appreciated that additional circumferentially spaced water flow control portions may be provided within the upper plate 88 of the second flow control member 54. Such additional water flow control portions may provide for additional flow rates, as desired. Additionally, the circumferential spacing or angular positioning of the flow control portions 134, 136, 138, 140 may vary based upon desired flow control characteristics.

Figure 11:
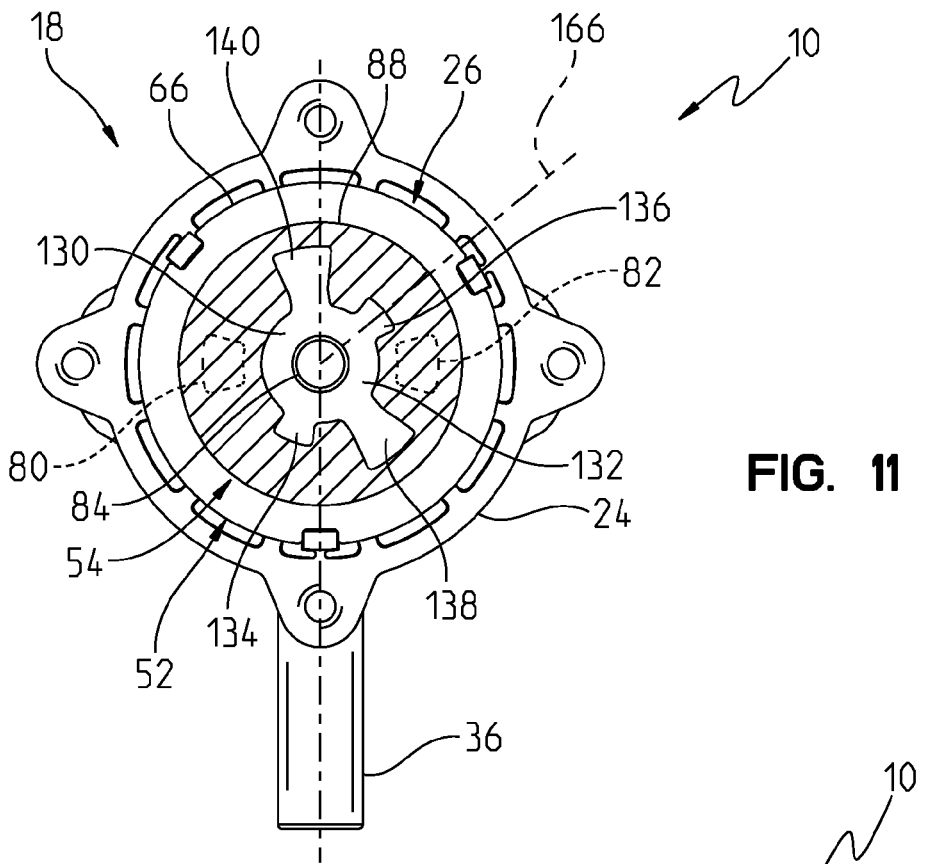
FIG. 11 is a top view, in partial cross-section, of the mixing valve of FIG. 1, showing the mixing valve in an off mode.

With reference now to FIGS. 11-17, operation of the mixing valve 10 is further illustrated. FIG. 11 shows the mixing valve 10 in an off mode, where the hot water inlet port 80 and the cold water inlet port 82 of the first flow control member 52 are covered or blocked by the second flow control member 54. In other words, the flow control channel 130 is sealed from fluid communication with the inlet ports 80 and 82. FIG. 11 shows a reference axis 166 extending through the first cold water flow control portion 136 of the flow control channel 130 to assist in identifying the relative angular orientation of the second flow control member 54 in FIGS. 12-17.

Figure 12:
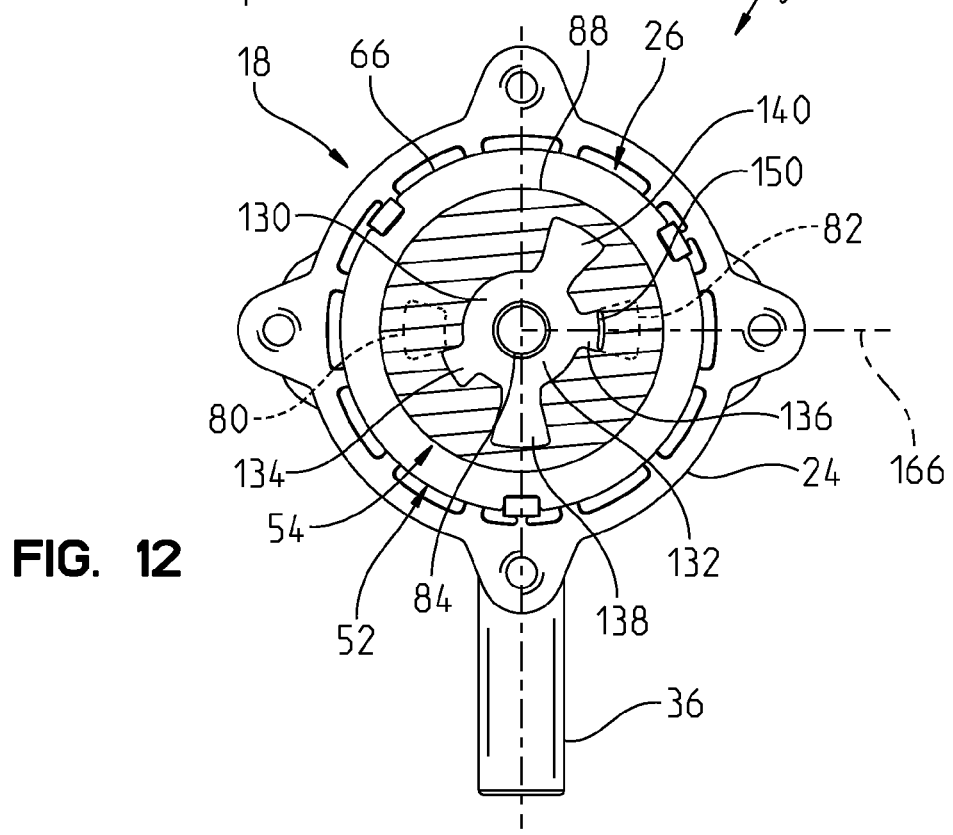
FIG. 12 is a view similar to FIG. 11, showing the mixing valve in a low flow, full cold mode.

FIG. 12 illustrates a low flow, full cold mode where the second flow control member 54 rotated clockwise by approximately 40 degrees from the position of FIG. 11, such that the first cold water flow control portion 136 fully overlaps with the cold water inlet port 82. More particularly, the first cold water flow control portion 136 fully overlaps the cold water inlet port 82 to define fluid passageway 150 having the cross-sectional flow area for providing low flow of cold water to the outlet port 84 and the outlet conduit 36.

FIG. 13 illustrates a low flow, full mixed mode when the second flow control member 54 has been rotated clockwise by approximately 15 degrees from the position of FIG. 12. The first cold water flow control portion 136 and the first hot water flow control portion 134 partially overlap with the cold water inlet port 82 and the hot water inlet port 80 to define fluid passageways 154 and 156, respectively, for providing low flow of mixed water to the outlet port 84 and the outlet conduit 36. More particularly, in the position of FIG. 13, the cross-sectional area of fluid passageway 154 is substantially equal to the cross-sectional area of fluid passageway 156 to provide equal mixing of cold water and hot water.

FIG. 14 illustrates the low flow, full hot position, where the second flow control member 54 has been rotated clockwise 15 degrees from the position of FIG. 14. In this position, the first hot water flow control portion 134 fully overlaps the hot water inlet port 80 of the first flow control member 52 to define fluid passageway 152 having the cross-sectional flow area for providing low flow of hot water to the outlet port 84 and the outlet conduit 36.

FIG. 15 illustrates the high flow, full cold mode, where the second flow control member 54 is rotated clockwise by approximately 30 degrees from the position of FIG. 14. In this position, the second cold water flow control portion 140 fully overlaps the cold water inlet port 82 to define the cross-sectional flow area for providing high flow of cold water to the outlet port 84 and the outlet conduit 36. As such, rotation of the second flow control member 54 within an angular range (illustratively about 30 degrees) from the low flow, full cold mode of FIG. 12 to the low flow, full hot mode of FIG. 14 varies temperature (i.e. mixing ratio of hot and cold water) while maintaining a substantially consistent low flow rate of water delivered by the flow control channel 130 to the outlet port 84.

FIG. 16 illustrates the high flow, fully mixed mode, where the second flow control member 54 is rotated clockwise by 15 degrees from the position of FIG. 15. The second cold water flow control portion 140 and the second hot water flow control portion 138 partially overlap with the cold water inlet port 82 and the hot water inlet port 80 to define fluid passageways 162 and 164, respectively, for providing high flow of mixed water to the outlet port 84 and the outlet conduit 36. More particularly, in the position of FIG. 16, the cross-sectional area of fluid passageway 162 is substantially equal to the cross-sectional area of fluid passageway 164 to provide equal mixing of cold water and hot water.

FIG. 17 illustrates the high flow, full hot mode of operation, where the second flow control member 54 is rotated clockwise 15 degrees from the position of FIG. 16. In this position, the second hot water flow control portion 138 fully overlaps the hot water inlet port 80 of the first flow control member 52 to define fluid passageway 160 having the cross-sectional flow area for providing high flow of hot water to the outlet port 84 and outlet conduit 36. As such, rotation of the second flow control member 54 within an angular range (illustratively about 30 degrees) from the high flow, full cold mode of FIG. 15 to the high flow, full hot mode of FIG. 17 varies temperature (i.e. mixing ratio of hot and cold water) while maintaining a substantially consistent high flow rate of water delivered by the flow control channel 130 to the outlet port 84.

Although the invention has been described in detail with reference to certain preferred embodiments, variations and modifications exist within the spirit and scope of the invention as described and defined in the following claims.

The invention claimed is:
1. A mixing valve comprising:
a first flow control member including a first surface, a hot water inlet port, and a cold water inlet port;
a second flow control member including a second surface facing the first surface of the first flow control member, the second flow control member being supported for rotation about a center axis extending perpendicular to the second surface such that the second surface is in sliding contact with the first surface;
a flow control channel extending inwardly from the second surface of the second flow control member, the flow control channel including a first hot water flow control portion, a first cold water flow control portion circumferentially spaced from the first hot water flow control portion, a second hot water flow control portion circumferentially spaced intermediate the first cold water flow control portion and the first hot water flow control portion in a first angular direction from the first cold water flow control portion, and a second cold water flow control portion circumferentially spaced intermediate the first cold water flow control portion and the first hot water flow control portion in a second angular direction from the first cold water flow control portion, the first angular direction being one of clockwise and counterclockwise, and the second angular direction being the other of counterclockwise and clockwise;

a carrier operably coupled to the second flow control member for rotating the flow control portions of the flow control channel in an arcuate path about the center axis;

wherein rotation of the second flow control member about the center axis within a first angular range aligns at least one of the first hot water flow control portion with the hot water inlet port, and the first cold water flow control portion with the cold water inlet port for permitting fluid flow at a first flow rate through the flow control channel; and wherein rotation of the second flow control member about the center axis within a second angular range aligns at least one of the second hot water flow control portion with the hot water inlet port, and the second cold water flow control portion with the cold water inlet port for permitting fluid flow at a second flow rate through the flow control channel.

2. The mixing valve of claim 1, wherein rotation of the second flow control member within the first angular range controls the temperature of water within the flow control channel by varying the ratio of water flowing through the first hot water flow control portion and the first cold water flow control portion, and rotation of the second flow control member within the second angular range controls the temperature of water within the flow control channel by varying the ratio of water flowing through the second hot water flow control portion and the second cold water flow control portion.

3. The mixing valve of claim 1, wherein:
the first hot water flow control portion and the first cold water flow control portion each includes an outer control edge;
the second hot water flow control portion and the second cold water flow control portion each includes an outer control edge; and
the outer control edges of the second hot water flow control portion and the second cold water flow control portion are disposed radially outwardly from the outer control edges of the first hot water flow control portion and the first cold water flow control portion.

4. The mixing valve of claim 3, further comprising a central chamber fluidly coupling the first hot water flow control portion and the first cold water flow control portion with the second hot water flow control portion and the second cold water flow control portion.

5. The mixing valve of claim 1, further comprising a valve body including an interface cooperating with the first flow control member, a hot water inlet conduit in fluid communication with the hot water inlet port, and a cold water inlet conduit in fluid communication with the cold water inlet port.

6. The mixing valve of claim 5, further comprising a gasket positioned intermediate the interface of the valve body and the first flow control member, the gasket providing a seal between the hot water inlet conduit and the hot water inlet port, and the cold water inlet conduit and the cold water inlet port.

7. The mixing valve of claim 5, further comprising a housing cooperating with the valve body and defining a chamber receiving the first flow control member, the second flow control member, and the carrier.

8. The mixing valve of claim 5, wherein:
the first flow control member further includes a mixed water outlet port positioned intermediate the hot water inlet port and the cold water inlet port; and
the valve body includes a mixed water outlet conduit in fluid communication with the mixed water outlet port.

9. The mixing valve of claim 1, wherein the carrier includes a base operably coupled to the second flow control member, and a stem supported by the base and extending longitudinally along the center axis.

10. The mixing valve of claim 9, further comprising:
a housing receiving the first flow control member, the second flow control member, and the base of the carrier; and
a bearing ring positioned intermediate the housing and the base of the carrier, the stem extending through the bearing ring.

11. The mixing valve of claim 1, wherein the second flow control member includes a plate, and the flow control channel comprises a closed recess formed within the plate.

12. The mixing valve of claim 1, wherein the cross-sectional area of each of the first hot water flow control portion and the first cold water flow control portion is different from the cross-sectional area of each of the second hot water flow control portion and the second cold water flow control portion.

13. A mixing valve comprising:
a first flow control member including a first surface and a first inlet port;
a second flow control member including a second surface slidably engaging the first surface of the first flow control member;
a flow control channel extending inwardly from the second surface of the second flow control member, the flow control channel including a central chamber, a first water flow control portion extending radially outwardly from the central chamber and including an outer control edge, a second water flow control portion extending radially outwardly from the central chamber and circumferentially spaced from the first water flow control portion, a portion of the second surface extending circumferentially between the first water flow control portion and the second water flow control portion, the second water flow control portion including an outer control edge positioned radially outwardly from the outer control edge of the first water flow control portion; and
a carrier operably coupled to the second flow control member for moving the water flow control portions of the flow control channel;
wherein full overlap of the first water flow control portion and the first inlet port defines a fluid passageway having a first cross-sectional flow area, and full overlap of the second water flow control portion and the first inlet port defines a fluid passageway having a second cross-sectional flow area, the first cross-sectional flow area being less than the second cross-sectional flow area, such that fluid flows through the first cross-sectional flow area at a first flow rate and fluid flows through the second cross-sectional flow area at a second flow rate, the first flow rate being less than the second flow rate.

14. The mixing valve of claim 13, wherein the second flow control member is supported for rotation about a center axis extending perpendicular to the second surface.

15. The mixing valve of claim 14, wherein:
the first flow control member includes a second inlet port in spaced relation to the first inlet port;
the first water flow control portion includes a first hot water flow control portion, and a first cold water flow control portion circumferentially spaced from the first hot water flow control portion;
the second water flow control portion includes a second hot water flow control portion circumferentially spaced intermediate the first cold water flow control portion and the first hot water flow control portion in a first angular direction from the first cold water flow control portion, and a second cold water flow control portion circumferentially spaced intermediate the first cold water flow control portion and the first hot water flow control portion in a second angular direction from the first cold water flow control portion;

wherein rotation of the second flow control member within a first angular range aligns at least one of the first hot water flow control portion with the first inlet port, and the first cold water flow control portion with the second inlet port for permitting fluid flow at a first flow rate through the flow control channel; and wherein rotation of the second flow control member within a second angular range aligns at least one of the second hot water flow control portion with the first inlet port, and the second cold water flow control portion with the second inlet port for permitting fluid flow at a second flow rate through the flow control channel.

16. The mixing valve of claim 15, further comprising a valve body including an interface cooperating with the first flow control member, a hot water inlet conduit in fluid communication with the first inlet port, and a cold water inlet conduit in fluid communication with the second inlet port.

17. The mixing valve of claim 16, further comprising a gasket positioned intermediate the interface of the valve body and the first flow control member, the gasket providing a seal between the hot water inlet conduit and the first inlet port, and the cold water inlet conduit and the second inlet port.

18. The mixing valve of claim 16, further comprising a housing cooperating with the valve body and defining a chamber receiving the first flow control member and the second flow control member.

19. The mixing valve of claim 16, wherein:
the first flow control member further includes an outlet port positioned intermediate the hot water inlet port and the cold water inlet port; and
the valve body includes an outlet conduit in fluid communication with the outlet port.

20. The mixing valve of claim 14, wherein the carrier includes a base operably coupled to the second flow control member, and a stem supported by the base and extending longitudinally along the center axis.

21. The mixing valve of claim 13, wherein the second flow control member includes a plate, and the flow control channel comprises a closed recess formed within the plate.

22. The mixing valve of claim 13, further comprising an electric motor operably coupled to the carrier for moving the second flow control member.

23. A mixing valve comprising:
a first flow control member including a first surface, a hot water inlet port, and a cold water inlet port;
a second flow control member including a second surface facing the first surface of the first flow control member, the second flow control member being supported for rotation about a center axis extending perpendicular to the second surface such that the second surface is in sliding contact with the first surface; and
a flow control channel extending inwardly from the second surface of the second flow control member;
wherein the second flow control member is rotatable about the center axis between an off position, a first flow position, and a second flow position, the off position defined when the second surface of the second flow control member blocks water flow from passing through the hot water inlet port and the cold water inlet port, the first flow position defined by rotating the second flow control member about the center axis within a first angular range wherein the flow control channel permits water flow to pass through at least one of the hot water inlet port and the cold water inlet port at a substantially constant first flow rate from a full cold temperature to a full hot temperature, and the second flow position defined by rotating the second flow control member about the center axis within a second angular range wherein the flow control channel permits water flow to pass through at least one of the hot water inlet port and the cold water inlet port at a substantially constant second flow rate from a full cold temperature to a full hot temperature, wherein the second angular range is greater than the first angular range.

24. The mixing valve of claim 23, wherein the flow control channel includes a first hot water flow control portion, a first cold water flow control portion circumferentially spaced from the first hot water flow control portion, a second hot water flow control portion circumferentially spaced intermediate the first cold water flow control portion and the first hot water flow control portion in a first angular direction from the first cold water flow control portion, and a second cold water flow control portion circumferentially spaced intermediate the first cold water flow control portion and the first hot water flow control portion in a second angular direction from the first cold water flow control portion.

25. The mixing valve of claim 24, wherein rotation of the second flow control member within the first angular range controls the temperature of water within the flow control channel by varying the ratio of water flowing through the first hot water flow control portion and the first cold water flow control portion, and rotation of the second flow control member within the second angular range controls the temperature of water within the flow control channel by varying the ratio of water flowing through the second hot water flow control portion and the second cold water flow control portion.

26. The mixing valve of claim 24, wherein:
the first hot water flow control portion and the first cold water flow control portion each includes an outer control edge;
the second hot water flow control portion and the second cold water flow control portion each includes an outer control edge; and
the outer control edges of the second hot water flow control portion and the second cold water flow control portion are disposed radially outwardly from the outer control edges of the first hot water flow control portion and the first cold water flow control portion.

27. The mixing valve of claim 24, further comprising a central chamber fluidly coupling the first hot water flow control portion and the first cold water flow control portion with the second hot water flow control portion and the second cold water flow control portion.

28. The mixing valve of claim 23, further comprising a valve body including an interface cooperating with the first flow control member, a hot water inlet conduit in fluid communication with the hot water inlet port, and a cold water inlet conduit in fluid communication with the cold water inlet port.

29. The mixing valve of claim 28, further comprising a gasket positioned intermediate the interface of the valve body and the first flow control member, the gasket providing a seal between the hot water inlet conduit and the hot water inlet port, and the cold water inlet conduit and the cold water inlet port.

30. The mixing valve of claim 28, further comprising a housing cooperating with the valve body and defining a chamber receiving the first flow control member and the second flow control member.

31. The mixing valve of claim 28, wherein:
the first flow control member further includes a mixed water outlet port positioned intermediate the hot water inlet port and the cold water inlet port; and
the valve body includes a mixed water outlet conduit in fluid communication with the mixed water outlet port.

32. The mixing valve of claim 23, further comprising a carrier including a base operably coupled to the second flow control member, and a stem supported by the base and extending longitudinally along the center axis.

33. The mixing valve of claim 23, wherein the second flow control member includes a plate, and the flow control channel comprises a closed recess formed within the plate.

34. The mixing valve of claim 23, further comprising an electric motor operably coupled to the second flow control member.

35. A mixing valve comprising:
a first flow control member including a first surface and a first inlet port;
a second flow control member including a second surface slidably engaging the first surface of the first flow control member;
a flow control channel extending inwardly from the second surface of the second flow control member, the flow control channel including a central chamber, a first water flow control portion extending radially outwardly from the central chamber and including an outer control edge, a second water flow control portion extending radially outwardly from the central chamber and circumferentially spaced from the first water flow control portion, the second water flow control portion including an outer control edge positioned radially outwardly from the outer control edge of the first water flow control portion;
a carrier operably coupled to the second flow control member for moving the water flow control portions of the flow control channel;
wherein full overlap of the first water flow control portion and the first inlet port defines a fluid passageway having a first cross-sectional flow area, and full overlap of the second water flow control portion and the first inlet port defines a fluid passageway having a second cross-sectional flow area, the first cross-sectional flow area being less than the second cross-sectional flow area;
wherein the second flow control member is supported for rotation about a center axis extending perpendicular to the second surface;
the first flow control member includes a second inlet port in spaced relation to the first inlet port;
the first water flow control portion includes a first hot water flow control portion, and a first cold water flow control portion circumferentially spaced from the first hot water flow control portion;
the second water flow control portion includes a second hot water flow control portion circumferentially spaced intermediate the first cold water flow control portion and the first hot water flow control portion in a first angular direction from the first cold water flow control portion, and a second cold water flow control portion circumferentially spaced intermediate the first cold water flow control portion and the first hot water flow control portion in a second angular direction from the first cold water flow control portion;
wherein rotation of the second flow control member within a first angular range aligns at least one of the first hot water flow control portion with the first inlet port, and the first cold water flow control portion with the second inlet port for permitting fluid flow at a first flow rate through the flow control channel; and
wherein rotation of the second flow control member within a second angular range aligns at least one of the second hot water flow control portion with the first inlet port, and the second cold water flow control portion with the second inlet port for permitting fluid flow at a second flow rate through the flow control channel.

* * * * *